(No Model.)
H. B. GARRIGUES.
PROCESS OF MOLDING PLASTIC MATERIAL.
No. 468,222. Patented Feb. 2, 1892.
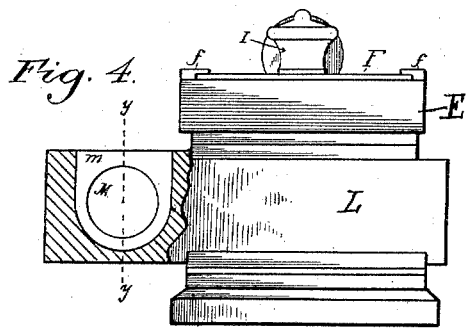
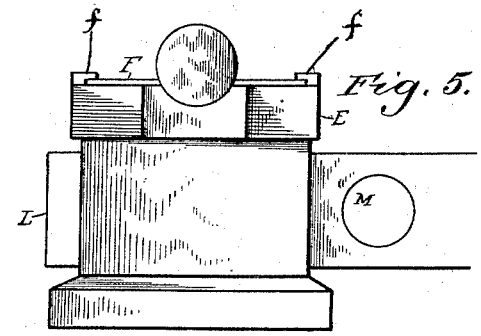
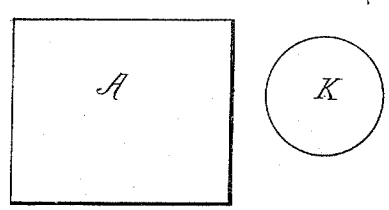
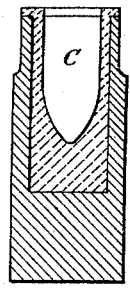
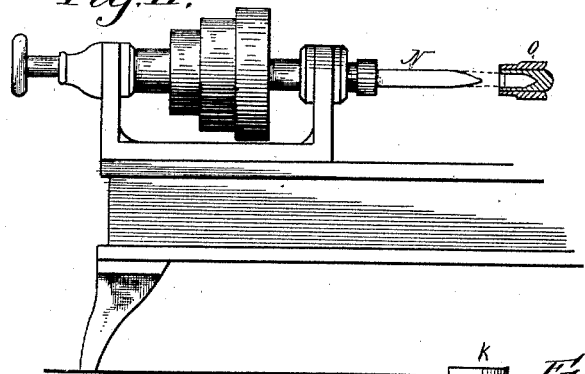
Witnesses:
H. B. McGirr.
J. C. Sturr.
Inventor:
Harry B. Garrigues
G. Dinkleday & Hinattys

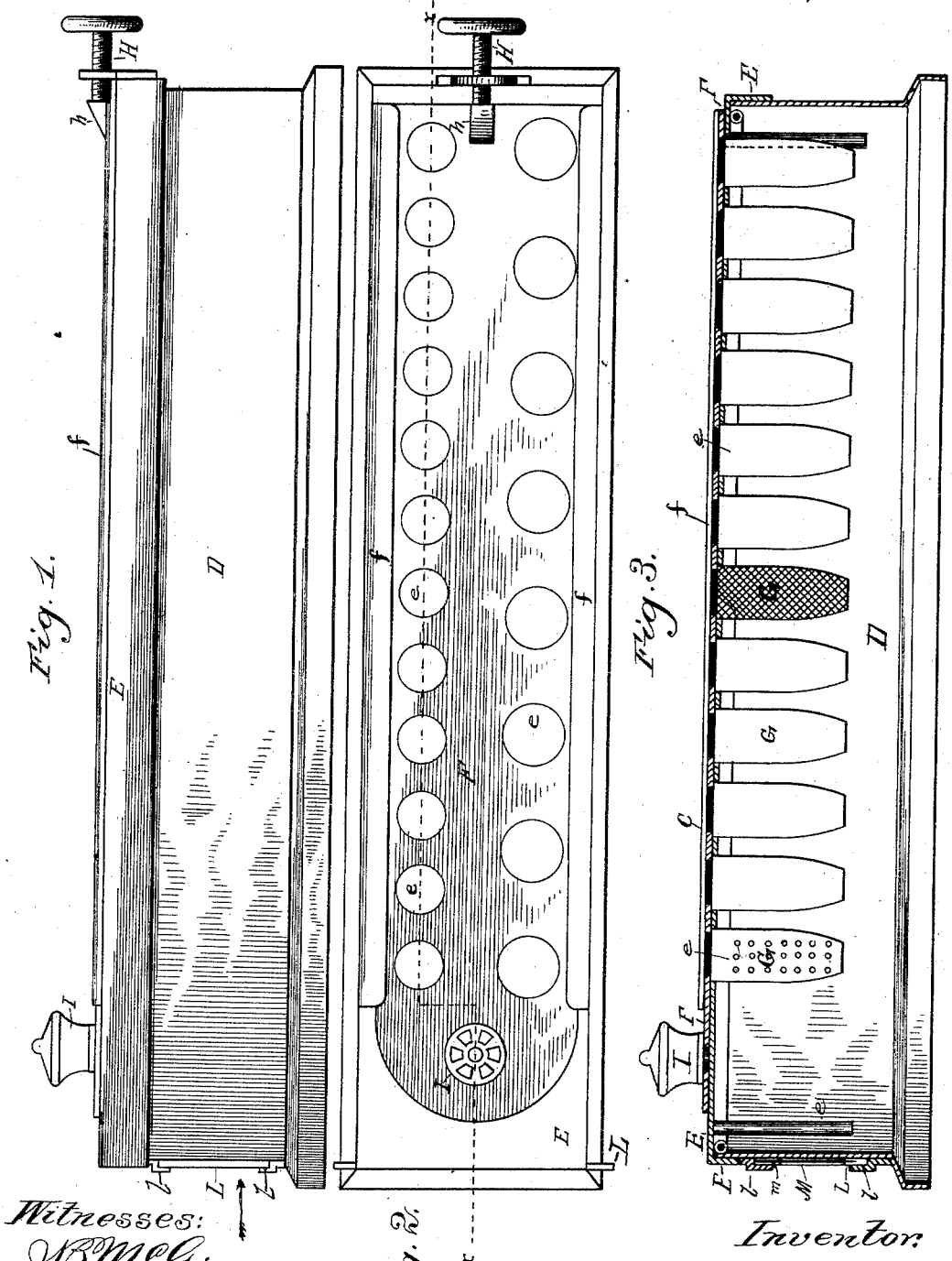

UNITED STATES PATENT OFFICE.

HARRY B. GARRIGUES, OF MASSILLON, OHIO.

PROCESS OF MOLDING PLASTIC MATERIAL.

SPECIFICATION forming part of Letters Patent No. 468,222, dated February 2, 1892.

Application filed June 15, 1891. Serial No. 396,326. (No model.)

*To all whom it may concern:*

Be it known that I, HARRY B. GARRIGUES, a citizen of the United States, residing at Massillon, in the county of Stark and State of Ohio, have invented certain new and useful Improvements in the Process of Molding Plastic Material, of which the following is a specification, reference being had therein to the accompanying drawings.

Figure 1 is a side elevation of a receiver used in the working of my invention. Fig. 2 is a top or plan view of Fig. 1. Fig. 3 is a vertical section taken on line $xx$, Fig. 2. Fig. 4 is an end view of Fig. 1, looking in the direction of the arrow 1. Fig. 5 is an end view of Fig. 1 looking in the opposite direction. Fig. 6 is a vertical section on line $yy$, Fig. 4, showing the cover-blank in position. Fig. 7 is a plan view of a blank from which I make a mold. Fig. 8 is a vertical section of a matrix. Fig. 9 is an elevation of a punch or die. Fig. 10 is an elevation of a lifting-pin. Fig. 11 is an elevation of part of a machine for producing the molds by spinning. Fig. 12 shows a blank wrapped around the die. Fig. 13 shows a completed mold and cap.

Like reference-letters refer to similar parts in all of the figures.

One object of my invention is to facilitate the formation or production of cheap molds in which to manufacture articles out of plastic material of many of the well-known sorts or kinds, some of which require considerable pressure in order to properly impart to them the desired configuration. I have found that in many cases it is desirable to leave the article thus manufactured in the mold in which it has been formed, such being particularly the case when the material is of such character that it might become so softened by the temperature to which it would be subjected in storage or transportation that it would be liable to get pressed out of its original shape, particularly when large numbers of the articles are packed in boxes one on top of another. It is well-known that the tensile strength of foil is greatly increased by an alloy of tin and lead, such alloy having a much greater tensile strength than is possessed by either of those metals alone; but as the plastic material employed is sometimes composed of ingredients which are subject to deterioration if kept in contact with any metal like lead I have found it desirable to make my molds of foil which is produced from chemically-pure tin without any alloy of lead or other metal, notwithstanding its lack of strength. I have found, however, that by subjecting a pure tin-foil to an annealing process I can so change its molecular structure as to impart to it such increased tensile strength as will enable it to withstand without fracture the pressure required for the packing into a mold of plastic material with such pressure as will insure a satisfactory conformation of the article produced to the interior of the mold.

In carrying out this part of my process of manufacture I subject sheets of tin-foil to a temperature of about 300° Fahrenheit during a period of about three hours in a suitably-constructed annealing-oven, and for this purpose an ordinary oven, such as is used by dentists for vulcanizing, may be conveniently employed, the heat being produced by a jet of ordinary illuminating-gas. It has not been found necessary to embed the sheets of tin in any material of a chemical nature or containing chemical ingredients, as is ordinarily followed when annealing cast-iron. I have found that the temperature may vary somewhat from the preferred point of 300° Fahrenheit; but if a much higher temperature is employed there is danger of its becoming brittle, especially if the heat approaches its melting-point, which is about 442° Fahrenheit. A somewhat lower temperature than 300° may be used with a corresponding increase of length of time of its exposure or period of annealing, although I have found in practice that the highest degree of tensile strength can be obtained with a temperature which is maintained with considerable uniformity at 300°, as above named. After thus annealing the tin-foil I take a blank A and wrap it around a punch B, the blank being of such size that its edges overlap each other somewhat, as is indicated in the full line and dotted line, Fig. 12. I then twist or otherwise manipulate the lower end of the tubular-shaped partly-formed mold, there being of course sufficient excess of material at the lower end of the die to form a number of overlapping or creased folds, as is indicated in Fig. 13. This operation so far secures the overlapping edges in position that the die and the partly-formed mold can be inserted part way into the matrix C. When this has been done, I next, preferably by means of a hammer, drive the die so far toward the bottom of the matrix as to condense the overlapping edges and the overlapping or creased folds at the point of the die in such manner as to make the mold nearly homogeneous throughout its entire length. This union of overlapping surfaces is so complete that the mold will bear the handling and strain which are put upon it, particularly the internal pressure, without fracture or separation of its overlapping surfaces. It is obvious that by reason of the increase of thickness at the tapering end of the mold, which is due to the overlapping folds, this part is materially strengthened, especially against external pressure, which is a very desirable feature, as will be hereinafter explained.

Having thus described one mode which I employ in the manufacture of these molds, I will now set forth one advantageous method of using them with plastic material.

Referring to Figs. 1 to 6, D is the body of the receiver, formed, preferably, of sheet or cast metal; but it may be made of any suitable material. E is the cover, provided, preferably, with a depending flange to fit over the upper edge of the body. This cover is provided with a series of holes $e\ e$. In practice I make these holes of different sizes, the holes in one row being, however, preferably of one size. F is a cutter-plate fitting closely the upper surface of the cover and sliding in ways or flanges $f\ f$, formed upon or attached to the cover and embracing the edges of the cutter-plate. This cutter-plate is provided with a series of holes arranged to register with the holes $e\ e$ of the cover and corresponding thereto in sizes. G G represent a series of pockets which depend from the under side of the cover, the holes $e\ e$ opening into the upper ends of the pockets, which correspond at their upper ends in size to the holes. These pockets are substantially cylindrical in form, except that they are somewhat contracted at their lower ends. I prefer to make them of some finely reticulated or perforated material—such, for instance, as a woven-wire fabric or perforated sheet metal—and of such size that they will fit closely the outer surface of the molds throughout the greater part of their length, but so that the lower ends of the molds shall project some distance through the lower open ends of the pockets. H is an adjusting-screw mounted in an upright or arm attached to the cover. $h$ is a spur or lug on the sliding cutter-plate to abut against the inner end of the adjusting-screw when the holes in the cover and the cutter-plate register exactly. I is a thumb-piece projecting upward from the cutter-plate to take hold of when the operator is sliding the cutter-plate backward and forward. K is a blank of tin-foil, preferably round. L is a plate, which for convenience I prefer to support adjustably on the end of the receiver by means of overlapping flanges or ways $l\ l$, which fit so closely as to hold the plate in any position by frictional contact therewith, but permit it to be inserted and moved endwise by the use of a reasonable amount of force. This plate is provided with a series of holes of varying sizes, corresponding quite accurately to the diameter of the different-sized molds. This plate is further provided with a series of recesses about midway between its sides and opening upward through its upper edge, where they form throats to receive the cover-blanks K. The lower ends of these recesses $m\ m$ are preferably curvilinear in form and concentric to the holes M, and at such distance below the holes that the centers of the blanks will coincide with the centers of the holes, thus leaving a margin of foil of about a uniform width around the holes, for a purpose to be explained.

In Fig. 11 I have represented an ordinary lathe having a mandrel or spindle with a tapering end and a form, the spindle N being a little smaller in diameter than the bore of the form O, so that by wrapping a blank A around the spindle in substantially the same manner that I wrap it around the punch the molds may be rapidly formed and the foil condensed at its overlapping portions as effectively as can be done by the die and matrix, with the further advantage that while the spindle is revolving rapidly the outer surface of the mold can be highly polished.

In using these molds for the manufacture of articles from plastic material I insert them in the pockets G with their lower ends projecting through the lower ends of the pockets, the molds being of such length that their upper ends are about flush with the upper surface of the cover. A convenient way to handle the molds during this operation is to pick them up successively upon the lifting-pin P. After the molds are thus placed in position I fill them with the plastic material, taking care to press it in with such force as may be necessary to fill them practically in every part, and thus insure that they shall conform in external configuration to the shape of the molds, removing whatever surplus material there may be from their upper ends by a sliding movement of the cutter-plate. Then push the cutter-plate back until the stop or lug $h$ strikes the end of the adjusting-screw. I prefer to have the body of the receiver partly filled with either cold water or a freezing mixture to insure a slight reduction in the diameter of the articles through a reduction of their temperature. The articles thus produced, together with their molds, may be forced out of the pockets by removing the cover from the body of the receiver and applying sufficient pressure to the lower ends of the molds, preferably by the thumb and finger of the operator.

It will be readily understood without further explanation that the strengthening of the molds by the condensation of the overlapping creased foil at their lower ends, as has been explained, facilitates thus ejecting the articles from the pockets without injury or change of shape of their lower pointed ends, particularly when the plastic material is of comparatively little density or firmness, this being especially true when the plastic material is of such character that some time is required for it to set or harden. After the articles have been removed from the sockets they may be separated from the foil with but little difficulty by either of two or three modes of procedure, according to the character of the plastic material. For instance, if it be not too adhesive and be left in the cold water or freezing-liquid, or if the material will readily let go of the foil upon being warmed slightly, they can be easily slipped out of the molds by an external pressure upon their tapering ends, or the mold can be peeled off by making a slit, extending part of the length of the mold, with a sharp knife. Under some conditions, however, it is desirable to leave the article inside of its mold and to close the upper end of the mold with an air-tight cap. To accomplish this I place one of the circular blanks K in the recess, which it fits at its edges, and which is adjacent to one of the holes M, which corresponds in diameter to the mold. I then insert the open end of the mold and the squared end of the article in the hole M against the blank and push the article endwise through the hole, forcing with it the blank, the edges of which is turned down and formed into a flange, fitting tightly the outer edge of the mold and forming a practically air-tight joint therewith. I prefer to thus form and apply these caps k very soon after the articles are removed from the sockets, at a time when their diameter has been somewhat reduced by the cold water or freezing mixture, in order that, first, the firmness of the plastic material will facilitate the formation of the cap and the compression of the flange against the body, and, secondly, that the subsequent slight increase in diameter, as its temperature rises to the normal, will insure that the flange of the cap shall fit a little more closely than it would otherwise do. It is evident that the material within the mold serves as a core, without which it would be impossible to form the flanged cap by the above-described operation, because the thin fragile mold would not bear the pressure required without the core to either push the blank through the holes M, to say nothing of supporting the sides of the mold against the pressure required to force the flange into close contact with the outer surface of the mold near its open end.

Wherever I use herein the words "pressed against the mold and the core," I mean that the flange has been so compressed or condensed against the outer surface of the mold that the latter is crowded against the outer surface of the core, although, of course, the flange is not, strictly speaking, in contact with the core.

Instead of condensing the overlapping edges by means of a blow from a hammer, this result may be accomplished in a press wherein the die may be forced into the matrix by a lever or a cam under such an adjustment of parts as will effect an intimate union of the metal at the overlapping surfaces without unduly stretching or weakening any part of the foil.

Another advantage which is incident to the use of a foil made from pure tin is this: Under many conditions, particularly where it is desirable to retain the mold upon the article for its protection, the lead in an alloy would be subject to corrosion such that the integrity of the foil would be so far reduced as to destroy its value, whereas a foil made from chemically-pure tin will not be subject to such deterioration under the same exposure.

Among the articles in the manufacture of which I propose to use these molds are the following: A compound of gum-arabic, glue, vinegar, and whiting to be used in place of the ordinary liquid mucilage as an article of commerce, and which it is desirable to form with one pointed end to facilitate its application after being first wet. With such plugs or sticks it is very desirable that they be kept from exposure to the air during transportation and sale. Hence my invention is especially adapted for such use.

Another article which I propose to form in such molds is an erasive soap for removing stains and grease from cloth, &c., such articles being usually made with one pointed end. In the actual use of such plugs of soap, mucilage, or similar compounds or material it will be found convenient to remove only a small portion of the foil at one time from the lower end, leaving the body of the plug covered, so as to protect the fingers of the person handling it.

Another material that I propose to shape in such molds is a bottle-stopper, to be made of cheap spongy rubber or other suitable substance, and in such case I propose to leave the upper end of the mold projecting beyond the plug in order that after it is inserted in the neck of the bottle the foil may be pressed down over the end of the stopper.

It will be readily seen that the use of chemically-pure tin is preferable to an alloy, because it will not be acted upon by some liquids which would attack the alloy, and the annealing of the tin imparts sufficient strength to insure it against fracture by the manipulation to which such stoppers will ordinarily be subjected in the handling and corking of the bottle.

What I claim is—

1. As an improvement in the art of making articles from plastic material, the herein-described method of molding by introducing the material into molds while the latter are suspended in open-bottomed pockets, reducing the diameter of the article by means of cold, and afterward closing the open ends of the molds by turning the edge of a blank over the end of the core and the mold, substantially as set forth.

2. As an improvement in the art of making articles from plastic material, the hereindescribed method of molding by introducing the material into a mold made of a thin foil, reducing the diameter of the article by means of cold, and thrusting a cap-blank through a closely-fitting opening by pressure upon the core and the closed end of the mold, thereby forming a flanged cap, substantially as set forth.

3. As a new article of manufacture, a package of plastic material having an open-ended mold, a core of plastic material within the mold, and a cap provided with a flange which is pressed against the mold and the core, substantially as set forth.

In testimony whereof I affix my signature in presence of two witnesses.

HARRY B. GARRIGUES.

Witnesses:
WM. MCMILLAN,
EDWARD HATHAWAY.